United States Patent
Brooker et al.

(10) Patent No.: US 8,656,133 B2
(45) Date of Patent: Feb. 18, 2014

(54) MANAGING STORAGE EXTENTS AND THE OBTAINING OF STORAGE BLOCKS WITHIN THE EXTENTS

(75) Inventors: Christopher G. Brooker, New Paltz, NY (US); Alfred F. Foster, Wappingers Falls, NY (US); Duane C. Hughes, Cape Vincent, NY (US); Charles E. Mari, Wappingers Falls, NY (US); Robert Miller, Jr., Poughkeepsie, NY (US); Harris M. Morgenstern, Wappingers Falls, NY (US); Walter W. Otto, Clinton Corners, NY (US); Steven M. Partlow, Beacon, NY (US); Thomas F. Rankin, Wallkill, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/101,731

(22) Filed: May 5, 2011

(65) Prior Publication Data

US 2012/0284478 A1 Nov. 8, 2012

(51) Int. Cl.
*G06F 12/00* (2006.01)

(52) U.S. Cl.
USPC .......................................... 711/170; 711/154

(58) Field of Classification Search
USPC ............ 711/170, E12.002, 173, 154, 52, 112, 711/151, 202; 714/42, 49; 345/543; 707/813, 821

See application file for complete search history.

(56) References Cited

U.S. PATENT DOCUMENTS

| | | | |
|---|---|---|---|
| 4,638,424 A | 1/1987 | Beglin et al. | |
| 4,771,375 A | 9/1988 | Beglin et al. | |
| 5,394,539 A | 2/1995 | Neuhard et al. | |
| 5,675,790 A | 10/1997 | Walls | |
| 5,784,698 A | 7/1998 | Brady et al. | |
| 5,784,699 A * | 7/1998 | McMahon et al. | 711/171 |
| 5,784,707 A | 7/1998 | Khalidi et al. | |
| 5,813,045 A | 9/1998 | Mahalingaiah et al. | |
| 6,061,763 A | 5/2000 | Rubin et al. | |
| 6,112,301 A | 8/2000 | Johnson | |
| 6,182,089 B1 | 1/2001 | Ganapathy et al. | |
| 6,202,134 B1 | 3/2001 | Shirai | |

(Continued)

FOREIGN PATENT DOCUMENTS

CN 101093455 A 12/2007

OTHER PUBLICATIONS

IBM Technical Disclosure Bulletin, Jul. 1973, pp. 474-476, attached as IBM_TMB_07_1973_p474_476.pdf.*

(Continued)

*Primary Examiner* — Matthew Bradley
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Auxiliary storage is segmented into different types of extents (i.e., ranges of storage), including extents with 4K blocks of storage, extents with 1M blocks of storage, empty extents, and mixed extents that include blocks of storage of various sizes (e.g., 4K blocks and 1M blocks). The auxiliary storage, and in particular, the extents and blocks of storage therein, are managed to reduce storage fragmentation and optimize system performance.

20 Claims, 4 Drawing Sheets

(56) References Cited

U.S. PATENT DOCUMENTS

| | | | |
|---|---|---|---|
| 6,223,335 B1* | 4/2001 | Cartwright et al. | 717/100 |
| 6,598,143 B1 | 7/2003 | Baker et al. | |
| 6,701,420 B1 | 3/2004 | Hamilton et al. | |
| 6,718,445 B1 | 4/2004 | Lewis et al. | |
| 6,738,866 B2 | 5/2004 | Ting | |
| 6,782,466 B1 | 8/2004 | Steele et al. | |
| 6,889,307 B1 | 5/2005 | Scheuerlein | |
| 6,961,835 B2 | 11/2005 | Lightstone et al. | |
| 7,080,081 B2 | 7/2006 | Agarwal et al. | |
| 7,225,313 B2 | 5/2007 | Mather et al. | |
| 7,236,974 B2 | 6/2007 | Bhattacharjee et al. | |
| 7,437,529 B2 | 10/2008 | Burugula et al. | |
| 7,484,072 B2 | 1/2009 | Hepkin et al. | |
| 7,543,123 B2 | 6/2009 | Evanchik et al. | |
| 7,765,211 B2 | 7/2010 | Bhattacharjee et al. | |
| 7,802,070 B2 | 9/2010 | Cholleti et al. | |
| 8,312,242 B2* | 11/2012 | Casper et al. | 711/170 |
| 8,417,912 B2 | 4/2013 | Olszewski | |
| 2003/0084266 A1 | 5/2003 | Knippel et al. | |
| 2004/0128466 A1 | 7/2004 | Kadohiro | |
| 2005/0005080 A1 | 1/2005 | Dunshea et al. | |
| 2006/0004977 A1 | 1/2006 | Jann et al. | |
| 2007/0156997 A1* | 7/2007 | Boule et al. | 711/170 |
| 2008/0104358 A1 | 5/2008 | Noel et al. | |
| 2009/0055609 A1 | 2/2009 | Kuczynski et al. | |
| 2010/0070733 A1* | 3/2010 | Ng et al. | 711/171 |
| 2010/0106930 A1 | 4/2010 | Foltz et al. | |
| 2010/0161929 A1* | 6/2010 | Nation et al. | 711/170 |
| 2010/0211756 A1 | 8/2010 | Kaminski et al. | |
| 2011/0087857 A1 | 4/2011 | Bomma et al. | |
| 2012/0054466 A1 | 3/2012 | Devendran et al. | |
| 2012/0246386 A1 | 9/2012 | Akutsu et al. | |
| 2012/0274479 A1 | 11/2012 | Foster et al. | |
| 2012/0284457 A1 | 11/2012 | Foster et al. | |
| 2012/0284458 A1 | 11/2012 | Foster et al. | |
| 2012/0284483 A1 | 11/2012 | Foster et al. | |

OTHER PUBLICATIONS

IBM Technical Disclosure Bulletin, May 1976, p. 4110, attached as IBM_TMB_05_1976_P4110.pdf.*
Wang, Feng, "Storage Management in Large Distributed Object-Based Storage Systems", University of California, Dec. 2006.
Matyas, M. et al., "Reviersible Data Mixing Procedure for Efficient Public-Key Encryption," Oct. 1998.
Scheifler, Robert W., "X Window System Protocol, Version 11, Alpha Update," Jun. 1987.
"z/Architecture—Principles of Operation", IBM Publication No. SA22-7832-08, Aug. 2010.
Olszewski, Bret R., et al., "Management of Low-Paging Space Conditions in an Operating System," U.S. Appl. No. 12/875,831, filed Sep. 3, 2010.
Foster, Alfred F., et al., "Selecting an Auxiliary Storage Medium for Writing Data of Real Storage Pages," U.S. Appl. No. 13/101,725, filed May 5, 2011.
Foster, Alfred F., et al., "Managing Large Page Memory Pools," U.S. Appl. No. 13/101,735, filed May 5, 2011.
Foster, Alfred F., et al., "Managing Allocation of Memory Pages," U.S. Appl. No. 13/101,791, filed May 5, 2011.
Office Action for U.S. Appl. No. 13/459,144 dated May 22, 2013, pp. 1-32.
Office Action for U.S. Appl. No. 13/101,725 dated May 5, 2011, pp. 1-46.
Office Action for U.S. Appl. No. 13/101,735 dated Jun. 28, 2013, pp. 1-55.
Wiseman, Yair et al., "Advanced Operating Systems and Kernel Applications: Techniques and Technologies," Information Science Reference, published Sep. 2009, pp. 1-320.
Navarro, Juan et al., "Practical, Transparent Operating System Support for Superpages," Rice University, ACM SIGOPS Operating Systems Review—OSDI '02, vol. 36, Issue SI, Winter 2002 (no further date information available), pp. 89-104.
Subramanian, Indira et al., "Implementation of Multiple Pagesize Support in HP-UX," Proceeddings of the USENIX Annual Technical Conference (No. 98), Jun. 1998, pp. 1-15.
Gopinath, K. et al., "Program Analysis for Page Size Selection," Department of Computer Science & Automation, Indian Institute of Science, Bangalore, Aug. 1996, pp. 189-194.
Wienand, Ian, "A Survey of Large-Page Support," University of New South Sales, 2006 (no further date information available), pp. 1-52.
Qu et al., "GISP: A Transparent Superpage Support Framework for Linux," Microprocessor Research and Development Center, Peking University, Apr. 2007, pp. 359-364.
Zhang, Xiaohui et al., "Performance Improvement for Multicore Processors Using Variable Page Technologies," 2011 Sixth IEEE International Conference on Networking, Architecture and Storage, Jul. 2011, pp. 230-235.
"z/Architecture—Principles of Operation," IBM Document No. SA22-7832-08, Aug. 2010, p. 10-108.
Talluri, Madhusudhan and Mark D. Hill, "Surpassing the TLB Performance of Superpages with Less Operating System Support," University of Wisconsin, Mar. 1994, pp. 171-182.
Wienand, Ian, "Transparent Large-Page Support for Itanium Linux," University of South Wales, Jul. 2008, pp. 1-117.
"z/OS Basic Skills Information Center—z/OS Concepts," IBM Corporation, ©2006, 2010 (no further date information available), pp. 1-117.
Romer, Theodore Haynes, "Using Virtual Memory to Improve Cache and TLB Performance," University of Washington, 1998 (no further date information available), pp. 1-157.
Office Action for U.S. Appl. No. 13/101,791 dated Jul. 30, 2013, pp. 1-42.
Weisberg, P. and Y. Wiseman, "Using 4KB Page Size for Virtual Memory is Obsolete," Jul. 2009, pp. 262-265.
Walsh, Kathy, "z/OS 1.9: Large Page Support," IBM Advanced Technical Support, Apr. 2008, pp. 1-12.
Tzortzatos, Elpida, "z/OS Basics: Virtual Storage Management (VSM) Overview," 2009 (no further date information available), pp. 1-68.
"AIX Version 5.3—Performance Management", IBM Reference No. SC23-4905-06, Seventh Edition, Oct. 2009, pp. 1-416.
Wang, Feng, "Storage Management in Large Distributed Object-Based Storage Systems", University of California, Dec. 2006, pp. 1-195.
Matyas, M. et al., "Reversible Data Mixing Procedure for Efficient Public-Key Encryption," Oct. 1998, pp. 1-12.
Scheifler, Robert W., "X Window System Protocol, Version 11, Alpha Update," Jun. 1987, pp. 1-90.
"z/Architecture—Principles of Operation", IBM Publication No. SA22-7832-08, Aug. 2010, pp. 1-1496.
Murray, Bill, "Mixing Formal and Dynamic Verification, Part 1," SCDsource 2007-2010, pp. 1-31 (no further date information available).
Khalidi, Yousef A., et al., "Virtual Memory Support for Multiple Pages," Sun Microsystems Laboratories, Inc., Sep. 1993, pp. 1-7.
Talluri, Madhusudhan, et al., "Tradeoffs in Supporting Two Page Sizes," Jun. 1992, pp. 415-424.
"Intelligent and Automated Allocation/Re-allocation of Paging Space to Enhance the Overall Operating System Performance," IP.com number: IPCOM000153048D, May 2007, pp. 1-4.
Tian, Yi et al., "Efficient Data Placement and Replacement Algorithms for Multiple-Level Memory Hierarchy," Proc. 10th International Conference on Parallel and Distributed Computing Systems, Oct. 1998, pp. 196-201.
Beretvas, Thomas, "Paging Enhancements in VM/SP HPO," pp. 728-737, Dec. 1984.
Knox, Deborah, et al., "Disk Swapping in Paged Distributed Virtual Memory Systems," pp. 153-157, Oct. 1994.

* cited by examiner

MANAGING STORAGE EXTENTS AND THE OBTAINING OF STORAGE BLOCKS WITHIN THE EXTENTS

BACKGROUND

One or more aspects of the present invention relate, in general, to managing storage of a computing environment, and in particular, to managing the obtaining of storage blocks.

A computing environment may include main memory, as well as auxiliary storage, such as direct access storage devices (DASD) or flash memory. Main memory includes pages of memory that are backed by real storage, referred to as real storage frames. These pages are ready to be accessed by applications, instructions, operations, or other entities. Main memory is limited in space, and therefore, typically only the most recently used pages of memory are maintained in main memory. The other pages of memory are maintained in auxiliary storage.

Auxiliary storage may include blocks of storage that are read and written. These blocks of storage are managed, including the allocation/deallocation of the blocks. In one example, the operating system tracks which blocks are currently being used and by what system components.

The allocation/deallocation of storage may lead to fragmentation and inefficient use of the auxiliary storage space.

BRIEF SUMMARY

The shortcomings of the prior art are overcome and additional advantages are provided through the provision of a computer program product for obtaining blocks of storage in a computing environment. The computer program product includes a storage medium readable by a processing circuit and storing instructions for execution by the processing circuit for performing a method. The method includes, for instance, selecting an extent with available space from a plurality of storage extents, the plurality of storage extents being of one or more types, the selecting including searching the plurality of extents in a predefined order, which is based on extent type, to select the extent with available space; and obtaining a block of storage from the selected extent, the block of storage being of a requested type.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, at least one type of auxiliary storage that is used is segmented into extents (i.e., ranges of storage). One example of this type of auxiliary storage is referred to as storage-class memory, and includes extents of different types, such as extents with 4 k blocks of storage, extents with 1M blocks of storage and/or empty extents, as examples. Further, in accordance with an aspect of the present invention, there may be mixed extents that include blocks of storage of various sizes (e.g., 4K blocks and 1M blocks). The auxiliary storage, and in particular, the extents and blocks of storage therein, are managed to reduce storage fragmentation and to optimize system performance.

Figure 1:
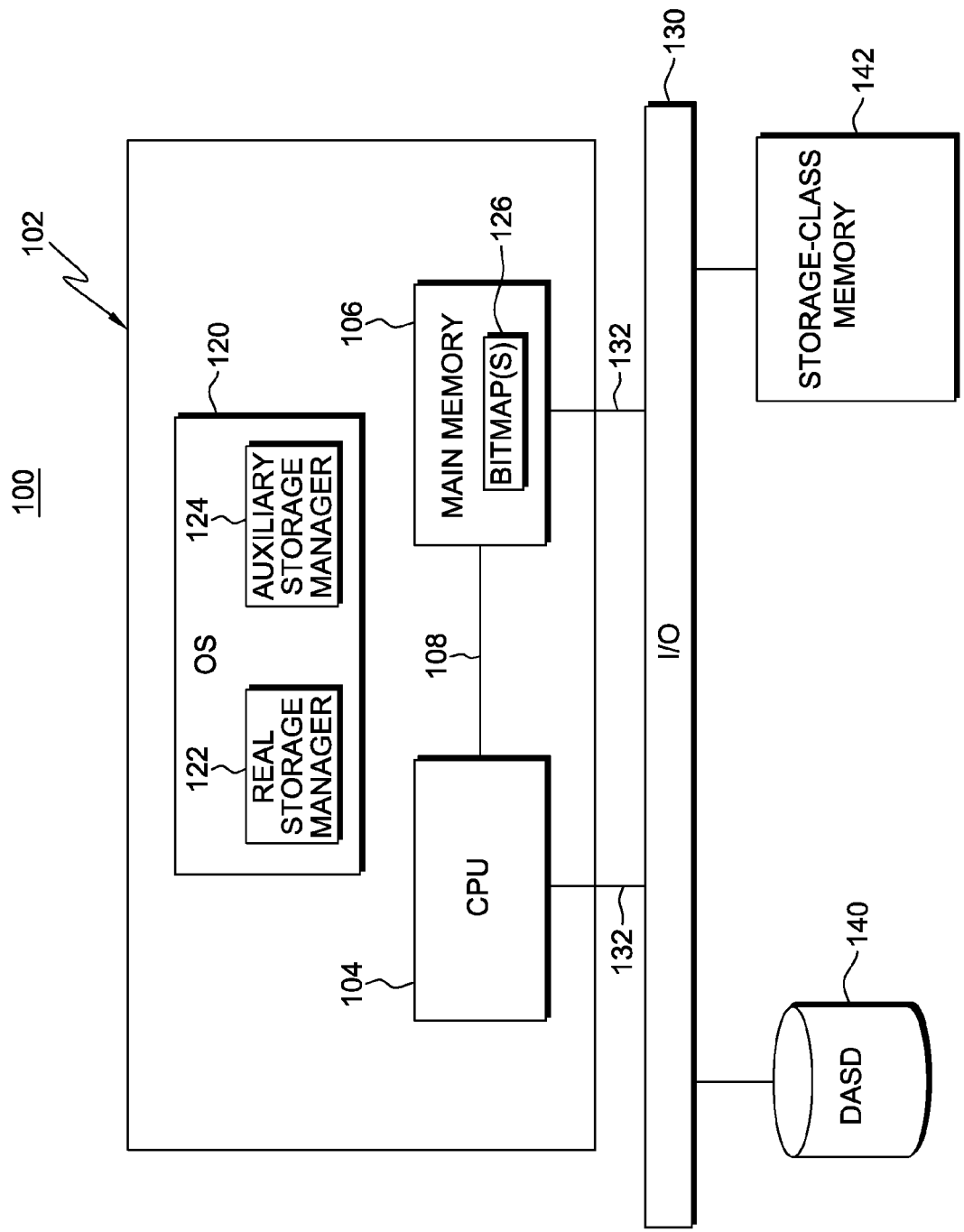
FIG. 1 depicts one example of a computing environment to incorporate and/or use one or more aspects of the present invention.

One embodiment of a computing environment to incorporate and/or use one or more aspects of the present invention is described with reference to FIG. 1. Computing environment 100 is based, for instance, on the Z/ARCHITECTURE® offered by International Business Machines Corporation, Armonk, N.Y. The Z/ARCHITECTURE® is described in an IBM® publication entitled, "z/Architecture Principles of Operation," IBM Publication No. SA22-7832-08, August 2010, which is hereby incorporated herein by reference in its entirety. In one example, a computing environment based on the Z/ARCHITECTURE® includes the ZENTERPRISE®196 (Z196) system, offered by International Business Machines Corporation, Armonk, N.Y. IBM® and Z/ARCHITECTURE® are registered trademarks, and ZENTERPRISE®196 and Z196 are trademarks of International Business Machines Corporation, Armonk, N.Y. USA. Other names used herein may be registered trademarks, trademarks or product names of International Business Machines Corporation or other companies.

As one example, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the Z/OS® operating system offered by International Business Machines Corporation. In other examples, one or more of the central processing units may execute other operating systems or no operating system. zZ/OS® is a registered trademark of International Business Machines Corporation, Armonk, N.Y. USA.

Central processing unit(s) 104 and main memory 106 are further coupled to an I/O subsystem 130 via one or more connections 132 (e.g., buses or other connections). The I/O subsystem provides connectivity to one or more auxiliary storage media, including, for instance, one or more direct access storage devices (DASD) 140 and storage-class memory 142 (e.g., flash memory). In one particular example of the z/Architecture®, the I/O subsystem is a channel subsystem. However, the I/O subsystem may be other than a channel subsystem, and the auxiliary storage media may be other than or in addition to DASD and storage-class memory.

Main memory and auxiliary storage are managed, in one example, by managers of operating system 120, including, for instance, a real storage manager 122 and an auxiliary storage manager 124. Real storage manager 122 is responsible for tracking the contents of main memory and managing the paging activities of main memory. Auxiliary storage manager 124 is responsible for tracking auxiliary storage and for working with the real storage manager to find locations to store real pages that are being paged-out from main memory.

The auxiliary storage manager manages various types of auxiliary storage, including storage-class memory, such as flash memory. In one embodiment, storage-class memory is read or written in varying storage block sizes, including 4K and 1M storage blocks, as examples. The operating system (e.g., auxiliary storage manager) keeps track of the blocks currently being used and by which system component.

To facilitate managing the blocks of storage, in one example, the storage is separated into extents. An extent is a range of storage. For instance, at start-up (e.g., IPL or boot), a size (e.g., 1G) is selected, and the storage-class memory is logically subdivided by the size creating the extents.

In accordance with an aspect of the present invention, an extent can be one of four types: (1) empty in which all blocks are available; (2) 4K in which it only includes 4K blocks of storage; (3) 1M in which it only includes 1M blocks of storage; and (4) mixed in which it includes a variety of block sizes, including in this example, 4K and 1M blocks of storage. In other examples, the blocks may be other than 4K or 1M, and the mixed type may include more than two block sizes. Further, there may be other types of extents. Associated with each extent is an indication of the type of extent, as well as a count of the number of free blocks and a bitmap 126 which indicates the blocks that are allocated (a.k.a., obtained), as described below.

Within an extent, blocks of storage may be allocated or freed. When the last allocated block of an extent is freed, the extent's type is dynamically changed to empty. Additionally, if a 4K block is freed from an extent of type 1M, such as when a 1M block is demoted (as described below), then the extent type is dynamically changed to mixed. As yet another example, if a 1M block is demoted, the extent type is dynamically changed to mixed. Other examples exist.

In one example, to demote a large page (e.g., 1M page) to a plurality of small pages (e.g., 4K pages), control blocks associated with the large page are changed. For example, a 1M page has 256 contiguous 4K pages, and each 4K page has associated therewith a control block (e.g., page frame table entry). Within each control block is an identifier (e.g., QID) that specifies the type of page. Thus, to demote the 1M page to 256 4K pages, the QID of each of the 256 control blocks is changed from an identifier specifying a 1M page to an identifier specifying a 4K page.

In one example, to obtain a block of storage from an extent, a bitmap 126 is used. Each extent has its own bitmap, and bitmap 126 includes, for instance, a bit for each 4K block of storage in the extent. When a 4K block is obtained, the bit corresponding to that block is set; if it is a 1M block that is obtained, 256 bits corresponding thereto are set.

In accordance with an aspect of the present invention, responsive to a request to obtain a block of storage-class memory, a particular extent is selected. The extent is selected based on the type of storage requested (e.g., size requested) and based on a predefined order, as described with reference to FIG. 2.

Figure 2:
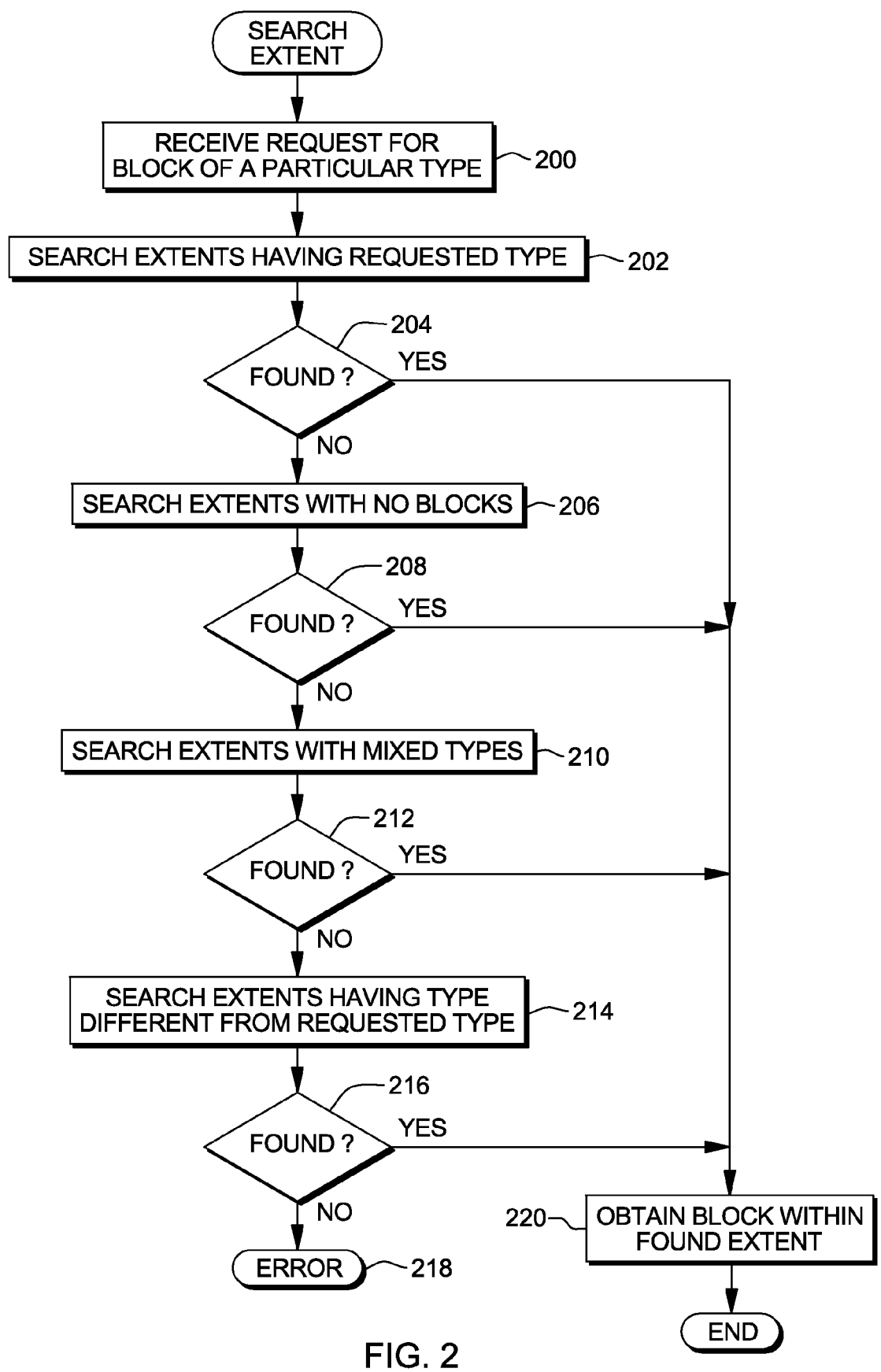
FIG. 2 depicts one embodiment of the logic to locate an extent from which a block of storage may be obtained, in accordance with an aspect of the present invention.

Referring to FIG. 2, initially, the auxiliary storage manager receives a request for a block of storage (e.g., a block of a particular type (e.g., size) of storage-class memory), STEP 200. Responsive to receiving this request, the auxiliary storage manager searches for an extent from which the block may be obtained. In accordance with an aspect of the present invention, the search is performed in a defined order, including: extents that contain only blocks of the requested type (4K or 1M, in this example); extents that contain no blocks (i.e., type is empty)—in this case, the extent, if selected, is changed to the requested block type when the block is obtained; extents that contain multiple types of blocks (e.g., 4K and 1M), i.e., type is mixed; extents that contain only blocks of a type other than the requested type—in this case, the extent is changed dynamically to type mixed, if it is selected.

Based on the foregoing, initially, the auxiliary storage manager searches extents that contain blocks of the requested type for an available extent, i.e., an extent having an indication of free blocks, STEP 202. If an extent having blocks of the requested type is unavailable, INQUIRY 204, a search is performed for an empty extent, STEP 206. If one is not found, INQUIRY 208, then the search continues looking for an available extent of mixed types, STEP 210. If there is no available extent of mixed type, INQUIRY 212, the search continues looking for extents that contain only blocks of the non-requested type (e.g., if 4K is requested, then search 1M extents; if 1M is requested, search 4K extents), STEP 214. If no such extent is available, INQUIRY 216, then an error is provided, since there are no available extents, STEP 218.

However, if any of the searches finds an available extent, then an attempt is made to obtain the requested block of storage from that extent, STEP 220. In one example, to obtain the block of storage, the bitmap associated with the extent is used, as described below.

One embodiment of the logic to obtain a 4K block of storage is described with reference to FIG. 3; and one embodiment of the logic to obtain a 1M block of storage is described with reference to FIG. 4. In one example, it is the auxiliary storage manager that performs the logic to obtain a block of storage.

Figure 3:
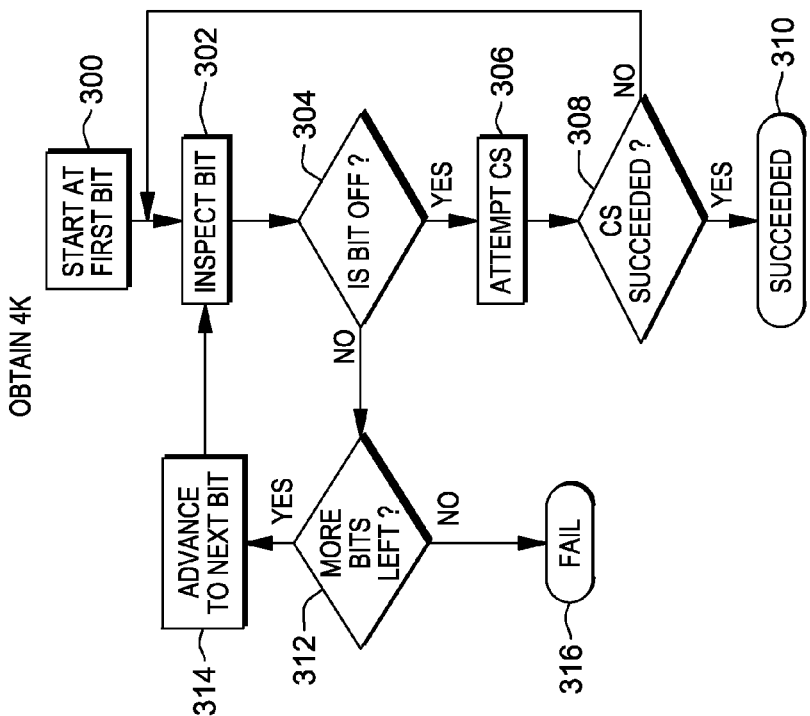
FIG. 3 depicts one embodiment of the logic to obtain a 4K block of storage from the extent located in FIG. 2, in accordance with an aspect of the present invention.

Referring initially to FIG. 3, in one example, a first bit of the bitmap associated with the chosen extent is selected, STEP 300, and inspected, STEP 302. A determination is made as to whether the bit is off, INQUIRY 304. If it is off, then an attempt is made to turn the bit on, STEP 306. As one example, a compare and swap operation is used in the attempt to turn the bit on. In one embodiment of a compare and swap operation, the first and second operands are compared. If they are equal, the third operand is stored at the second operand location. If they are unequal, the second operand is loaded into the first operand location. The result of the comparison is indicated in the condition code. Further details of compare and swap operations are described in the aforementioned IBM® publication entitled, "z/Architecture Principles of Operation," IBM Publication No. SA22-7832-08, August 2010, which is hereby incorporated herein by reference in its entirety.

If the compare and swap operation is successful, INQUIRY 308, then the block of storage is obtained (i.e., allocated and provided to the user), STEP 310, and processing is complete. However, if the compare and swap operation is not successful, INQUIRY 308, then processing returns to inspect the bit, STEP 302.

Returning to INQUIRY 304, if the bit is already on, then a check is made to determine if there are more bits left to be inspected, INQUIRY 312. If there is at least one other bit to be inspected, then the next bit is selected, STEP 314, and processing continues with STEP 302, in which the bit is inspected. If, however, there are no other bits to be inspected, then the obtaining of the 4K block of storage fails, STEP 316. Thereafter, another extent may be selected In addition to obtaining 4K blocks of storage, 1M blocks are also obtained. One embodiment of the logic to obtain a 1M block of storage, in accordance with an aspect of the present invention, is described with reference to FIG. 4. In one example, it is the auxiliary storage manager that performs this logic.

Figure 4:
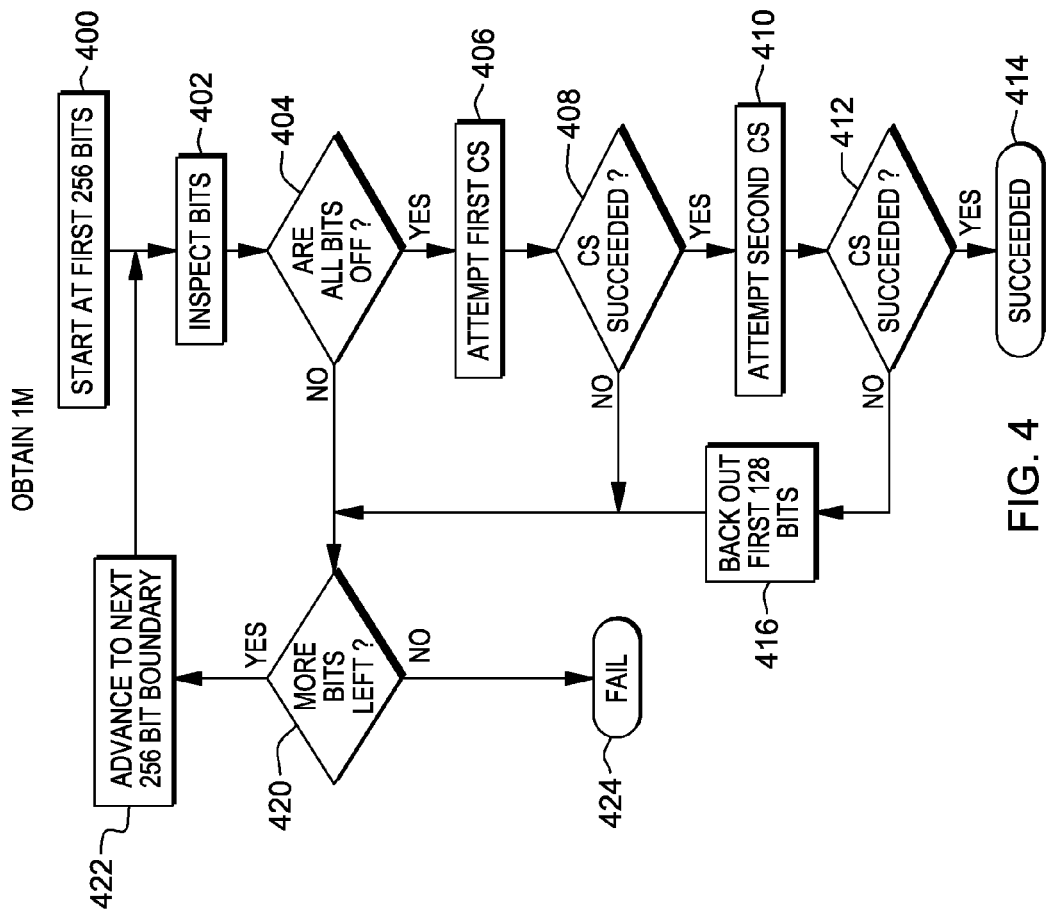
FIG. 4 depicts one embodiment of the logic to obtain a 1M block of storage from the extent located in FIG. 2, in accordance with an aspect of the present invention.

Referring to FIG. 4, in one example, the first 256 bits of the bitmap associated with the chosen extent are selected, STEP 400, and inspected, STEP 402. A determination is made as to whether all the bits are off, INQUIRY 404. If they are off, then, in this example, a compare and swap operation of the first 128 bits is performed in an attempt to turn the bits on, STEP 406. If the compare and swap operation is successful, INQUIRY 408, then another compare and swap operation is attempted for the next set of 128 bits, STEP 410. The compare and swap operation used herein compares and swaps a maximum of 128 bits. If other operations are used that can compare and swap more than 128 bits in a serialized fashion, then the second compare and swap operation may not be needed. Further, in other embodiments, if more than 256 bits are to be compared and swapped, more operations may be performed. Additionally, operations other than compare and swap may be used.

If the first and second compare and swap operations are successful, INQUIRY 412, then the 1M block of storage is obtained, STEP 414.

However, returning to INQUIRY 412, if the compare and swap operation of the second set of 128 bits is not successful, then the compare and swap of the first set of bits is backed out turning those bits off, STEP 416. Thereafter, or if the compare and swap operation of the first set of 128 bits is not successful, INQUIRY 408, or if the bits are already on, INQUIRY 404, then another determination is made as to whether there are more bits left to be inspected, INQUIRY 420. If there is at least one other set of 256 bits to be inspected, then the next 128 bits of the set of 256 bits is selected, STEP 422, and processing continues with STEP 402, in which the bits are inspected. If, however, there are no other bits to be inspected, then the obtaining of the 1M block of storage fails, STEP 424.

Responsive to the obtaining of the 1M block of storage failing, another search may be performed for an available, suitable extent.

Described in detail above is a capability for enabling the mixing of multiple block types (e.g., 4K, 1M) in the same extent allowing improved utilization of the available storage-class memory. When total space is constrained, separating by block size can lead to inefficient use of that space; therefore, intermixing of block sizes is beneficial. Further, at times, 1M blocks are demoted into 256 4K blocks; and again in this situation, intermixing of block sizes is advantageous. The extents are managed and searched in a manner that facilitates avoidance of fragmentation of the blocks, and improves performance by avoiding collisions when trying to obtain blocks of different sizes at the same time. Multiple block sizes in the same extent are supported while maintaining minimal fragmentation and optimal performance. Compare and swap operations are used to obtain different size blocks from a common extent bitmap.

In one embodiment, storage-class memory is allocated and managed to accommodate multiple sizes of storage blocks. Extents may be dynamically changed to accommodate workload, i.e., to accommodate requested types of storage. This is accomplished while minimizing fragmentation and optimizing system performance.

Additional information relating to main memory and auxiliary storage is provided in the following commonly assigned applications co-filed herewith, each of which is hereby incorporated herein by reference in its entirety: U.S. Ser. No. 13/101735, "MANAGING LARGE PAGE MEMORY POOLS" (POU920110067US1); U.S. Ser. No. 13/101791, "MANAGING ALLOCATION OF MEMORY PAGES" (POU920110068US1); and U.S. Ser. No. 13/101725, entitled "SELECTING AN AUXILIARY STORAGE MEDIUM FOR WRITING DATA OF REAL STORAGE PAGES" (POU920110069US1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
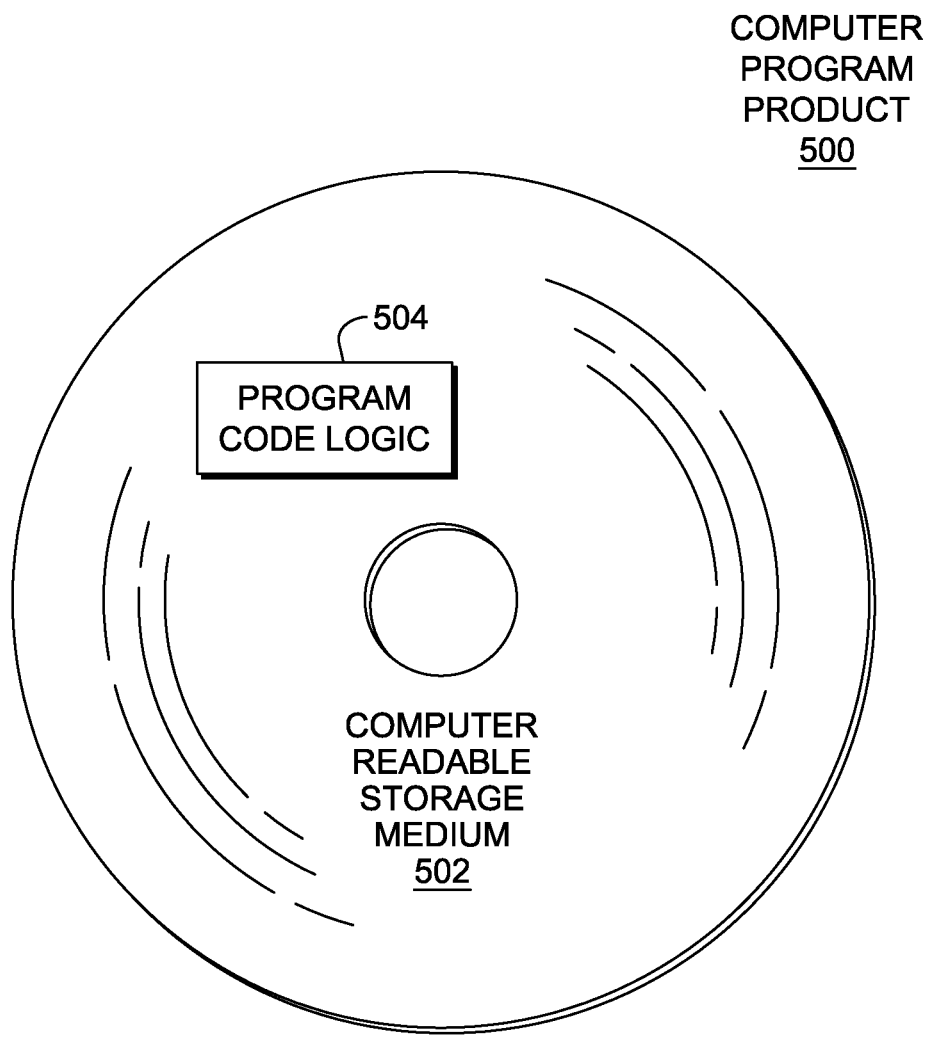
FIG. 5 depicts one embodiment of a computer program product to incorporate one or more aspects of the present invention.

Referring now to FIG. 5, in one example, a computer program product 500 includes, for instance, one or more non-transitory computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, although examples of auxiliary storage are described herein, other types of auxiliary storage may be used without departing from the spirit of the present invention. As used herein, auxiliary storage is any memory or storage other than main memory or associated caches. Further, other types of storage-class memory may be used. One or more aspects of the present invention can be employed for storage block sizes other than 4K and 1M. As examples, one or more aspects of the present invention can be employed for: sizes other than 4K and 1M where one is a multiple of the other size; more than two sizes where the larger sizes are a multiple of the smallest; or multiple sizes that are not a multiple of the smallest but where a single bit represents the greatest common divisor of the various sizes. One or more aspects of the present invention can be used for any contiguously addressable resource, including, but not limited to, storage-class memory. Additionally, operations other than compare and swap may be used to set/reset the bits of the bitmap. Moreover, indicators, other than bits of a bitmap, may be used in obtaining the blocks of storage.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for obtaining blocks of storage in a computing environment, said computer program product comprising:
   a non-transitory computer readable storage medium readable by a processing circuit and storing instructions for execution by the processing circuit for performing a method comprising:
      obtaining a request for a block of storage of a requested type, the storage being auxiliary storage, the auxiliary storage being separated into a plurality of storage extents of a predefined size, wherein a storage extent of the plurality of storage extents is a range of auxiliary storage of the predefined size and the storage extent initially has an extent type of empty associated therewith, the extent type of empty being the extent type for the extent until changed to another extent type based on satisfying a storage request, the another extent type comprising a first type in which the blocks of storage within the extent are exclusively of that first type or a mixed type in which the blocks of storage within the extent are of various types, and wherein the block of storage is to be obtained from a selected extent of the plurality of storage extents;
      based on obtaining the request, selecting the selected extent from the plurality of storage extents, wherein the selecting comprises searching the plurality of storage extents in a predefined order, which is based on extent type, to select an extent with available space as the selected extent, and wherein based on the selected extent having the extent type of empty, changing the extent type to the requested type of the block of storage; and
      obtaining the block of storage from the selected extent, said block of storage being of the requested type.

2. The computer program product of claim 1, wherein said predefined order comprises:
   one or more extents that exclusively include blocks of storage of the requested type;
   then, one or more extents that include no blocks of storage;
   then, one or more extents that include mixed types of blocks of storage, including blocks of storage of the requested type; and
   then, one or more extents that exclusively include blocks of storage other than the requested type; and
   wherein the searching initially terminates based on finding the selected extent with available space.

3. The computer program product of claim 2, wherein the selected extent is selected from the one or more extents that have no blocks of storage, and wherein the selected extent is changed from an empty extent to an extent of the requested type.

4. The computer program product of claim 2, wherein the selected extent is selected from the one or more extents that include exclusively blocks other than the requested type, and wherein the selected extent is changed to an extent that includes mixed types.

5. The computer program product of claim 1, wherein the requested type comprises a 4K block of storage or a 1M block of storage.

6. The computer program product of claim 1, wherein the obtaining comprises using a bitmap associated with the selected extent to obtain the block of storage.

7. The computer program product of claim 6, wherein the using comprises:

locating at least one bit of the bitmap that is off; and performing at least one operation for the at least one bit to turn the at least one bit on, wherein the block of storage is obtained based on the at least one operation being performed successfully.

8. The computer program product of claim 7, wherein the at least one operation comprises at least one compare and swap operation.

9. The computer program product of claim 6, wherein the requested type of storage is a 1M block of storage and wherein the using comprises:

locating a set of bits of the bitmap that is turned off;

performing a first compare and swap operation to turn on a first portion of the set of bits;

determining whether the first compare and swap operation was successful;

based on the first compare and swap operation being successful, performing a second compare and swap operation to turn on a second portion of the set of bits;

determining whether the second compare and swap operation was successful, wherein based on the second compare and swap operation being successful, the block of storage is obtained; and based on the second compare and swap operation being unsuccessful, backing out a result of the first compare and swap operation, wherein the first set of bits is turned off.

10. A computer system for obtaining blocks of storage in a computing environment, said computer system comprising:

a memory; and a processor in communications with the memory, wherein the computer system is configured to perform a method, said method comprising:

obtaining a request for a block of storage of a requested type, the storage being auxiliary storage, the auxiliary storage being separated into a plurality of storage extents of a predefined size, wherein a storage extent of the plurality of storage extents is a range of auxiliary storage of the predefined size and the storage extent initially has an extent type of empty associated therewith, the extent type of empty being the extent type for the extent until changed to another extent type based on satisfying a storage request, the another extent type comprising a first type in which the blocks of storage within the extent are exclusively of that first type or a mixed type in which the blocks of storage within the extent are of various types, and wherein the block of storage is to be obtained from a selected extent of the plurality of storage extents;

based on obtaining the request, selecting the selected extent from the plurality of storage extents, wherein the selecting comprises searching the plurality of storage extents in a predefined order, which is based on extent type, to select an extent with available space as the selected extent, and wherein based on the selected extent having the extent type of empty, changing the extent type to the requested type of the block of storage; and obtaining the block of storage from the selected extent, said block of storage being of the requested type.

11. The computer system of claim 10, wherein said predefined order comprises:

one or more extents that exclusively include blocks of storage of the requested type;

then, one or more extents that include no blocks of storage;

then, one or more extents that include mixed types of blocks of storage, including blocks of storage of the requested type; and then, one or more extents that exclusively include blocks of storage other than the requested type; and wherein the searching initially terminates based on finding the selected extent with available space.

12. The computer system of claim 11, wherein the selected extent is selected from the one or more extents that have no blocks of storage, and wherein the selected extent is changed from an empty extent to an extent of the requested type.

13. The computer system of claim 11, wherein the selected extent is selected from the one or more extents that include exclusively blocks other than the requested type, and wherein the selected extent is changed to an extent that includes mixed types.

14. The computer system of claim 10, wherein the obtaining comprises using a bitmap associated with the selected extent to obtain the block of storage.

15. The computer system of claim 14, wherein the using comprises:

locating at least one bit of the bitmap that is off; and performing at least one operation for the at least one bit to turn the at least one bit on, wherein the block of storage is obtained based on the at least one operation being performed successfully.

16. The computer system of claim 15, wherein the at least one operation comprises at least one compare and swap operation.

17. The computer system of claim 14, wherein the requested type of storage is a 1M block of storage and wherein the using comprises:

locating a set of bits of the bitmap that is turned off;

performing a first compare and swap operation to turn on a first portion of the set of bits;

determining whether the first compare and swap operation was successful;

based on the first compare and swap operation being successful, performing a second compare and swap operation to turn on a second portion of the set of bits;

determining whether the second compare and swap operation was successful, wherein based on the second compare and swap operation being successful, the block of storage is obtained; and based on the second compare and swap operation being unsuccessful, backing out a result of the first compare and swap operation, wherein the first set of bits is turned off.

18. A method of obtaining blocks of storage in a computing environment, said method comprising:

obtaining a request for a block of storage of a requested type, the storage being auxiliary storage, the auxiliary storage being separated into a plurality of storage extents of a predefined size, wherein a storage extent of the plurality of storage extents is a range of auxiliary storage of the predefined size and the storage extent initially has an extent type of empty associated therewith, the extent type of empty being the extent type for the extent until changed to another extent type based on satisfying a storage request, the another extent type comprising a first type in which the blocks of storage within the extent are exclusively of that first type or a mixed type in which the blocks of storage within the extent are of various types, and wherein the block of storage is to be obtained from a selected extent of the plurality of storage extents:

based on obtaining the request, selecting the selected extent from the plurality of storage extents, wherein the selecting comprises searching the plurality of storage extents in a predefined order, which is based on extent type, to select an extent with available space as the selected extent, and wherein based on the selected extent having the extent type of empty, changing the extent type to the requested type of the block of storage; and obtaining the block of storage from the selected extent, said block of storage being of the requested type.

19. The method of claim 18, wherein said predefined order comprises:

one or more extents that exclusively include blocks of storage of the requested type;

then, one or more extents that include no blocks of storage;

then, one or more extents that include mixed types of blocks of storage, including blocks of storage of the requested type; and then, one or more extents that exclusively include blocks of storage other than the requested type; and wherein the searching initially terminates based on finding the selected extent with available space.

20. The method of claim 18, wherein the obtaining comprises using a bitmap associated with the selected extent to obtain the block of storage, and wherein the using comprises:

locating at least one bit of the bitmap that is off; and performing at least one operation for the at least one bit to turn the at least one bit on, wherein the block of storage is obtained based on the at least one operation being performed successfully.

* * * * *